Patented Dec. 2, 1941

2,264,315

UNITED STATES PATENT OFFICE 2,264,315

THERMOPLASTIC INK

Wilbur L. Jones, New York, N. Y., assignor to Interchemical Corporation, New York, N. Y., a corporation of Ohio No Drawing. Application December 8, 1938, Serial No. 244,605

5 Claims. (Cl. 106—26)

This invention relates to thermoplastic printing inks adapted to be printed in the molten state, and has particular reference to such compositions containing very small percentages of cellulose alkyl ethers therein.

Printing with molten compositions is an old process. The method has been used principally for the production of "spot" carbon paper, where the carbon composition is confined to certain areas of the sheet, and for the production of thermoplastic transfers on paper, designed to be transferred to a fabric by the use of a hot iron.

The thermoplastic method of printing has certain obvious advantages over printing cold with conventional inks which are liquid at room temperature. In order to dry conventional inks, the liquid vehicle must be solidified; and this requires either a long time, as with the drying oil inks, or the removal of volatile solvents in an elaborate ventilating system, whereas the molten inks dry rapidly by mere cooling, without loss of any portion of the material.

Attempts to replace conventional inks with thermoplastic inks have, however, produced uniformly disappointing results. One serious difficulty has been the tendency of the ordinary thermoplastic melts to offset from one sheet of paper to the next when stored in stacks, causing sticking of the sheets to one another; this occurs even with compositions having melting points above the maximum temperatures of the storage space, due to the pressure exerted by the weight of the paper. A second objection to such prints has been their waxy feel, and their tendency to rub off more than conventional colored rotogravure inks. The most serious difficulty, however, has been the poor printing characteristics of such inks; the appearance of the prints has been generally so much poorer than that obtainable with conventional inks that the process has generally been abandoned as unsatisfactory.

In my co-pending application, Serial Number 244,607, filed December 8, 1938, I have disclosed that these objections to thermoplastic printing inks can be entirely overcome, and intaglio prints obtained which compare most favorably with conventional solvent ink prints, by formulating the inks so that the vehicles consist of a major portion of normally solid microcrystalline solvent material (such as the natural resin-free waxes of animal, vegetable and mineral origin, and the synthetic waxy materials such as high molecular weight alcohols and esters, and fully hydrogenated oils and oil acids, hereinafter referred to generically as solvent waxes) and a minor portion of viscosity imparting material, such as resin, which is soluble in the solvent wax both in the molten and the solid state, provided the ingredients are so chosen that the composition has a melting point between 150 and 300° F., and provided further that the composition has proper viscosity characteristics. In that application, I disclosed that any vehicle from which a good ink could be produced must have a minimum viscosity of at least one poise at some point before crystallization commenced in its cooling from a molten state, and that at least about 5% of resin was required to obtain such a viscosity with the solvent waxes. The upper limit of viscosity is there disclosed as fixed by the appearance of a screen effect in the finished prints when the printing is done at a temperature within 40° F. of the melting point of the ink, and 30% of resin was found to be the maximum permissible.

I have now discovered that the alkyl celluloses which are soluble in the solvent waxes may be used to impart printing viscosity to inks made therefrom, while simultaneously hardening the inks so that maximum resistance to abrasion is obtained. I have found that as little as 1% of a high viscosity ethyl cellulose will produce printing viscosity, while the most soluble grades of low viscosity cellulose alkyl ethers give the undesired screen effect when used in amounts exceeding 10%. With the grades of ethyl cellulose commercially available, I obtain optimum printing characteristics with from 1.5 to 3.5%.

The resultant inks may be colored by dispersion of pigment in the complete vehicle, or in any part thereof, on a two roll or Banbury mill, or in a heated ball mill. I prefer, however, to disperse the pigment in an oil which can act as a plasticizer for the cellulose alkyl ether.

Typical examples of my invention are the following:

EXAMPLE I.—Red ink 12 parts by weight lithol red ground in
14 parts by weight litho varnish, is blended with a molten solution of
1.5 parts by weight medium viscosity ethyl cellulose in
72.5 parts by weight fully hydrogenated castor oil (M. P. 183° F.)

This yields a red ink which gives very hard surfaced prints. The litho varnish acts as a plasticizer for the ethyl cellulose, while the hydrogenated castor oil is representative of the hydrogenated oils, which are particularly good solvents for ethyl cellulose.

Example II.—Black ink 8 parts by weight carbon black in
15 parts by weight litho varnish, and
3 parts by weight low viscosity ethyl cellulose in
74 parts by weight fully hydrogenated castor oil This is a black ink similar in characteristics to Example I.

I have used other solvent waxes and other cellulose alkyl ethers in such compositions, but care must be taken to select ethers which are soluble in the particular solvent waxes employed, particularly since the solubility varies with the degree of etherification.

Resins may be employed in conjunction with these inks, but since they likewise impart viscosity, care should be exercised that the combination of ether and resin does not impart excessive viscosity.

In the claims, the term "solvent wax" is used in its generic sense to refer to microcrystalline materials of waxy nature, and it includes the resin-free natural waxes of animal, vegetable and mineral origin, the synthetic waxy materials such as high molecular weight alcohols and esters, and hydrogenated fatty oils and oil acids.

I claim:

1. A thermoplastic printing ink printable at a temperature within 40° of its melting point and having a melting point between 150° and 300° F., comprising pigment dispersed in a vehicle including a major portion of a solvent wax capable of dissolving cellulose alkyl ethers and from one to ten per cent. of a cellulose alkyl ether soluble therein.

2. A thermoplastic printing ink printable at a temperature within 40° of its melting point and having a melting point between 150 and 300° F., the vehicle of which comprises a major portion of a hydrogenated fatty oil, and from one to ten per cent. of ethyl cellulose.

3. A thermoplastic printing ink printable at a temperature within 40° of its melting point and having a melting point between 150 and 300° F., the vehicle of which comprises one to ten per cent. of ethyl cellulose and a major portion of fully hydrogenated castor oil.

4. A thermoplastic printing ink printable at a temperature within 40° of its melting point and having a melting point between 150 and 300° F., the vehicle of which consists of fully hydrogenated castor oil containing from 1 to 10 per cent. of ethyl cellulose dissolved therein, and a plasticizer for the ethyl cellulose.

5. A thermoplastic printing ink printable at a temperature within 40° of its melting point and having a melting point between 150 and 300° F., comprising pigment dispersed in a vehicle consisting of fully hydrogenated castor oil containing from 1.5 to 3.5 per cent. of ethyl cellulose dissolved therein, and a plasticizer for the ethyl cellulose.

WILBUR L. JONES.